(12) United States Patent
Okamoto

(10) Patent No.: US 7,586,595 B2
(45) Date of Patent: Sep. 8, 2009

(54) METHOD OF SCANNING AND SCANNING APPARATUS

(75) Inventor: Toshihiko Okamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 1158 days.

(21) Appl. No.: 10/988,511

(22) Filed: Nov. 16, 2004

(65) Prior Publication Data

US 2005/0105142 A1 May 19, 2005

(30) Foreign Application Priority Data

Nov. 17, 2003 (JP) ............................. 2003-386657
Nov. 17, 2003 (JP) ............................. 2003-386677

(51) Int. Cl.
*G01N 21/00* (2006.01)
(52) U.S. Cl. .............. 356/237.2; 356/237.3; 356/237.4; 356/237.5
(58) Field of Classification Search ................ 358/474, 358/471, 505, 475, 482, 483, 496, 509, 513, 358/514; 428/425.9; 324/750; 73/865.8; 369/272.1–291.1, 53.11, 53.15, 44.32; 348/207.99; 356/237.1–237.5, 430, 431; 250/559.4–559.49
See application file for complete search history.

(56) References Cited

U.S. PATENT DOCUMENTS

| 5,268,735 | A | * | 12/1993 | Hayashi ................... 356/239.1 |
| 6,388,744 | B1 | * | 5/2002 | Kubota et al. ............ 356/237.3 |
| 7,239,588 | B2 | * | 7/2007 | Gotoh et al. ............... 369/53.2 |
| 2005/0230647 | A1 | * | 10/2005 | Gotoh et al. ........... 250/559.45 |

FOREIGN PATENT DOCUMENTS

| JP | 2-055940 A | 2/1990 |
| JP | 5-094622 A | 4/1993 |
| JP | 6-018439 A | 1/1994 |

(Continued)

OTHER PUBLICATIONS

English language abstract of JP2002-286653.

(Continued)

*Primary Examiner*—Michael P Stafira
(74) *Attorney, Agent, or Firm*—Greenblum & Bernstein, P.L.C.

(57) ABSTRACT

A method of scanning an information recording medium and a scanning apparatus for an information recording medium that uses the method scan for defects in respective resin layers of an information recording medium that has a plurality of resin layers and a plurality of information layers, which are separated by the respective resin layers, laminated on at least one surface of a substrate. The method includes: an image capture step of emitting scanning light toward the one surface at a predetermined incident angle from a fixed position on the one surface side, rotating the information recording medium in a fixed direction, and simultaneously receiving reflected light for the scanning light at a fixed position on an optical path of the reflected light to capture images at predetermined time intervals; a counting step of counting a number of images of a same defect that have been captured in the image capture step; and a specifying step of specifying that an (N–1)-th resin layer counting from the substrate side is a resin layer in which the defect is present when the counted number of images is N, where N is a natural number of two or higher.

4 Claims, 8 Drawing Sheets

FOREIGN PATENT DOCUMENTS

| | | |
|---|---|---|
| JP | 6-109649 A | 4/1994 |
| JP | 6-129842 | 5/1994 |
| JP | 7-112593 A | 5/1995 |
| JP | 7-286967 | 10/1995 |
| JP | 2000-028748 | 1/2000 |
| JP | 2001-004346 | 1/2001 |
| JP | 2002-286653 | 10/2002 |
| JP | 2004-039151 A | 2/2004 |
| JP | 2004-233338 | 8/2004 |

OTHER PUBLICATIONS

English language abstract of JP2002-28748.
English language abstract of JP2000-4346.
English language abstract of JP7-286967.
English language abstract of JP6-129842.
English language abstract of JP2004-233338.
English language Abstract and translation of JP 5-094622 A; Apr. 16, 1993.
English language Abstract and translation of JP 7-112593 A; May 2, 1995.
English language Abstract of JP 6-018439 A; Jan. 25, 1994.
English language Abstract of JP 2-055940 A; Feb. 26, 1990.
English language Abstract of JP 6-109649 A; Apr. 22, 1994.
English language Abstract of JP 2004-039151 A; Feb. 5, 2004.

\* cited by examiner

FIG. 12

BARE SUBSTRATE 111

|  | REFLECTIVITY [%] | LIGHT TRANSMISSIVITY [%] |
| --- | --- | --- |
| WHEN IRRADIATED FROM FRONT SURFACE 110a SIDE | 8.90 | 90.60 |
| WHEN IRRADIATED FROM REAR SURFACE 110b SIDE | 9.10 | 90.60 |

FIG. 13

BLANK SUBSTRATE 111 + HARD COAT LAYER 112

|  | REFLECTIVITY [%] | LIGHT TRANSMISSIVITY [%] |
| --- | --- | --- |
| WHEN IRRADIATED FROM FRONT SURFACE 110a SIDE | 8.70 | 90.50 |
| WHEN IRRADIATED FROM REAR SURFACE 110b SIDE | 8.75 | 90.60 |

FIG. 14

DEFFERENCE DUE TO PRESENCE OF HARD COAT LAYER 112 (RELATIVE VALUE)

|  | REFLECTIVITY [%] | LIGHT TRANSMISSIVITY [%] |
| --- | --- | --- |
| WHEN IRRADIATED FROM FRONT SURFACE 110a SIDE | 0.20 | 0.10 |
| WHEN IRRADIATED FROM REAR SURFACE 110b SIDE | 0.35 | 0.10 |

METHOD OF SCANNING AND SCANNING APPARATUS

BACKGROUND OF THE INVENTION

1. Field of the Invention

The first present invention relates to a method of scanning an information recording medium and a scanning apparatus for an information recording medium that scans for defects in resin layers of an information recording medium which has a plurality of recording layers.

Also, the second present invention relates to a method of scanning and a scanning apparatus that scan a resin layer, which has been formed on a substrate used to manufacture an information recording medium, for defects.

2. Description of the Related Art

As one example of a scanning apparatus according to the first invention, Japanese Laid-Open Patent Publication No. 2002-286653 discloses an automatic defect scanning apparatus that scans for defects in layers such as a reflective layer, a recording layer, and a resin layer (protective layer) of an optical recording medium. As shown in FIGS. 2 and 3 of the publication, this automatic defect scanning apparatus includes a lamp unit, two CCD sensors, a pickup, various kinds of circuits, and the like. In this automatic defect scanning apparatus, the lamp unit emits parallel light to irradiate the disc (an optical recording medium). When, for example, a defect is present in the reflective layer of the disc, a first of the CCD sensors detects light that has passed through the disc and outputs a detection signal. The second CCD sensor detects light that has been emitted by the lamp unit and reflected by the disc and outputs another detection signal. When a defect is present in the recording layer or the resin layer, a shadow produced in the reflected light by the defect is detected by the second CCD sensor. On the other hand, the pickup emits a laser beam onto the disc, detects light reflected by the disc, and outputs a detection signal. Here, the various circuits specify the lengths of the defects based on the detection signals and when the length of the defect exceeds a set length, the disc is judged to be defective. In this automatic defect scanning apparatus, since both scanning with emitted parallel light and scanning with an emitted laser beam are carried out, it is possible to judge with relatively high accuracy whether a disc is a defective disc with a defect in the reflective layer, the recording layer, the resin layer, or the like.

As one example of a scanning apparatus that scans an information recording medium using one example of a method of scanning according to the second invention, a protective film application judging apparatus (hereinafter simply "judging apparatus") is disclosed by Japanese Laid-Open Patent Publication No. 2000-28748. As shown in FIG. 11 of this publication, the judging apparatus includes a laser source that emits laser light (scanning light) used to irradiate an optical disc (information recording medium) being scanned, a PSD that receives light that has been reflected by the optical disc and outputs a current signal in accordance with the state of the received light, a rotation control unit that rotates the optical disc mounted on a base, and a microcomputer (see FIG. 12 of the publication) that detects defects based on the output signal of the PSD. On the other hand, the optical disc being scanned has films such as a dielectric film, a magnetic film, and a reflective film formed on a substrate (base) made of polycarbonate or the like, with a lubricating protective film (hereinafter, simply "protective film") for protecting the reflective film also being formed. This protective film is formed by first applying a UV curing resin in a ring at a central part of the optical disc (substrate), rotating the optical disc at high speed to spread out the UV curing resin uniformly across substantially the entire area of the optical disc using centrifugal force, and then exposing the resin to UV rays.

With this method, when, for example, the applied amount of UV curing resin is insufficient during the formation of the protective film, the UV curing resin cannot spread out to cover the entire area of the optical disc, and regions where the resin is not applied (i.e., defects) appear on the optical disc. Since proper recording and reproduction become problematic for the optical disc 9 when such defects are present, it is necessary to scan for the presence of such defects when manufacturing optical discs. More specifically, while an optical disc for which the formation of the protective film has been completed is being rotated by the rotation control unit, the optical disc is irradiated with laser light emitted by the laser source from the surface on which the protective film has been formed. When doing so, if the protective film of the optical disc is not flat (that is, when there are defects such as unapplied regions or irregularities in the application), the laser light emitted toward the protective film is reflected irregularly at the positions of the defects. This means that the amount of reflected light incident on the PSD falls, or there is a change in the incident position of the reflected light incident on the PSD. Accordingly, based on the reflected light incident on the PSD, the microcomputer judges that a defect is present when the amount of reflected light falls or when the incident position changes. At this time, the positions (detection sectors) where defects are detected are displayed on a display device. In this way, the scanning of the disc is completed.

By investigating the automatic defect scanning apparatus described above, the present inventor discovered the following problem. That is, with the automatic defect scanning apparatus described above, although it is possible to scan for defects in the reflective layer, the recording layer, and the resin layer, there are problems, for example, when scanning an information recording medium on which are laminated a plurality of recording layers that are separated by a plurality of resin layers. More specifically, to improve the manufacturing yield for products, it is preferable not only to identify products with defects but also, for example in a formation process for the resin layer, to correct formation conditions, such as the temperature of a resin material and rotational velocity used during spin coating, based on the scanning results so as to reduce the occurrence of defects. In this case, for an information recording medium with a multilayer structure, the respective resin layers normally have different thicknesses, so that the formation conditions for the respective resin layers are set separately. Accordingly, to correct the respective formation conditions, it is necessary to specify the resin layer in which a defect has occurred. However, with a conventional automatic defect scanning apparatus, it is only possible to scan for the simple presence of defects and not possible to specify the resin layer in which a defect is present, so that there is the problem that it is difficult to reduce the occurrence of defects in the resin layers.

Also, by investigating the method of scanning according to the judging apparatus described above, the present inventor discovered the following problem. That is, in the method of scanning used by the judging apparatus, when an optical disc is irradiated with laser light from the surface on which the protective film has been formed, it is determined that defects such as unapplied regions or irregularly applied parts are present in the protective film when the amount of light drops or the incident position changes for the reflected light that is incident on the PSD. To increase the recording density, current optical discs have increasingly high densities for data recording tracks (i.e., increasingly narrow pitches for data recording tracks). This means that it is necessary to reduce the beam spot diameter of the laser beam used during the recording and reproduction of data. Accordingly, even if there are only minute irregularities (defects) in the lubricating protective film (a hard coat layer or the like), the laser beam emitted onto the optical disc will be irregularly reflected at the defective parts, which prevents data from being recorded and reproduced properly. This means that during the manufacturing of optical discs, it is now necessary to scan for extremely fine defects that were not especially problematic for older optical discs. However, there is the problem that by using a conventional method of scanning where an optical disc is irradiated with laser light from the surface on which the protective film is formed, it is difficult to detect extremely fine defects that can cause problems for modern optical discs.

SUMMARY OF THE INVENTION

The first present invention was conceived in view of the former problem described above and it is a principal object of the present invention to provide a method of scanning an information recording medium and a scanning apparatus for an information recording medium that scan for defects in respective resin layers of an information recording medium on which a plurality of resin layers are formed and can specify in which resin layers the respective defects are present.

Also, the second present invention was conceived in view of the latter problems described above, and it is a principal object of the present invention to provide a method of scanning and scanning apparatus that can correctly scan for minute defects in a resin layer, such as a protective film, formed on a substrate.

A method of scanning an information recording medium according to the first present invention scans an information recording medium that has a plurality of resin layers and a plurality of information layers, which are separated by the respective resin layers, laminated on at least one surface of a substrate, the method scanning the respective resin layers for defects and including: an image capture step of emitting scanning light toward the one surface at a predetermined incident angle from a fixed position on the one surface side, rotating the information recording medium in a fixed direction, and simultaneously receiving reflected light for the scanning light at a fixed position on an optical path of the reflected light to capture images at predetermined time intervals; a counting step of counting a number of images of a same defect that have been captured in the image capture step; and a specifying step of specifying that an (N−1)-th resin layer counting from the substrate side is a resin layer in which the defect is present when the counted number of images is N, where N is a natural number of two or higher.

Also, a scanning apparatus for an information recording medium according to the first present invention includes: a scanning light emitting unit that is fixed on one surface side of an information recording medium having a plurality of resin layers and a plurality of information layers, which are separated by the respective resin layers, laminated on at least one surface of a substrate and emits scanning light at a predetermined incident angle toward the one surface; a rotating mechanism that rotates the information recording medium in a fixed direction; an image capture unit that is fixed on an optical path of reflected light for the scanning light and receives the reflected light to capture images at predetermined time intervals; a counting unit that counts a number of images of a same defect that have been captured by the image capture unit; and a specifying unit that specifies that an (N−1)-th resin layer counting from the substrate side is a resin layer in which the defect is present when the counted number of images is N (where N is a natural number of two or higher).

With the method of scanning an information recording medium and the scanning apparatus for an information recording medium according to the present invention, the counting step that counts the number of images of the same defect captured by the image capture step and the specifying step that specifies that an (N−1)-th resin layer counting from the substrate side is the resin layer in which the defect is present when the counted number of images is N are carried out, so that the resin layer in which the defect is present can be specified reliably and easily by counting the number of images. Accordingly, since it is possible to correct the formation conditions of the resin layer in which the defect is present to appropriate formation conditions, it is possible to reliably reduce the occurrence of defects in the resin layer, resulting in a considerable improvement in the yield of products. Also, since it is possible to immediately specify the resin layer in which a defect has occurred from the number of images without carrying out a complex calculation, even if many defects are present, it is possible to specify the resin layers in which the respective defects are present in a short time.

With the method of scanning the information recording medium described above, in the counting step, it is preferable for images with the same form to be found by carrying out image processing using image capture data captured during the image capture step and for the found images to be counted as images of the same defect. Also, with the scanning apparatus for an information recording medium described above, the counting unit should preferably carry out image processing using image capture data produced by the image capture unit to find images with the same form and count the found images as images of the same defect. By searching in this way, it is possible to correctly find images of the same form, and the ability to correctly count only images of the same defect makes it possible to correctly specify the resin layer in which the defect is present.

It should be noted that the disclosure of the present invention relates to a content of Japanese Patent Application 2003-386677 that was filed on 17 Nov. 2003 and the entire content of which is herein incorporated by reference.

A method of scanning according to the second present invention scans for defects in a resin layer formed by applying a light-transmitting resin material onto one surface of a substrate that transmits light, and includes: a step of irradiating the substrate with light for scanning from another surface of the substrate while the substrate is rotated; a step of receiving the light after the light has been reflected by the substrate; and a step of judging whether defects are present based on a state of the received light.

Also, a scanning apparatus according to the second present invention scans for defects in a resin layer formed by applying a light-transmitting resin material onto one surface of a substrate that transmits light and includes: a substrate rotating mechanism that rotates the substrate; a light emitting unit that irradiates the substrate with light for scanning from another surface of the substrate; a light receiving unit that receives the light after the light has been reflected by the substrate; and a scanning unit that scans for defects based on a state of the light received by the light receiving unit.

According to this method of scanning and scanning apparatus, light used for scanning is emitted onto another surface of the substrate, reflected light is received, and scanning for defects is carried out, so that there is a larger difference in reflectivity due to the presence or absence of a resin layer than in the case where the light used for scanning is emitted onto the surface of the substrate on which the resin surface is formed. This means that it is possible to reliably detect even minute defects that are difficult to detect with a conventional scanning apparatus (which uses a method of scanning where the light for scanning is emitted from the surface on which the resin surface is formed). As a result, it is possible to correctly scan whether a scanned object (for example, a precursor for an information recording medium) is defective or non-defective.

In this case, scanning for defects should preferably be carried out for an information recording medium precursor, the precursor including the substrate that has been formed of one of polycarbonate and polyolefin and the resin layer having been formed from acrylic resin on the one surface of the substrate. By scanning in this way, there is a great increase in the difference in reflectivity due to the presence or absence of a resin layer compared to when the light used for scanning is emitted onto the surface of the substrate on which the resin layer is formed, so that minute defects can be detected more reliably.

It should be noted that the disclosure of the present invention relates to a content of Japanese Patent Application 2003-386657 that was filed on 17 Nov. 2003 and the entire content of which is herein incorporated by reference.

BRIEF DESCRIPTION OF THE DRAWINGS

These and other objects and features of the present invention will be explained in more detail below with reference to the attached drawings, wherein:

FIG. 12 is a diagram useful in explaining the reflectivity and transmissivity for scanning light when a precursor (bare substrate) on which a hard coat layer has not been formed is irradiated with the scanning light from a front surface side and when the precursor is irradiated from a rear surface side;

FIG. 13 is a diagram useful in explaining the reflectivity and transmissivity for scanning light when a precursor on which a hard coat layer has been formed is irradiated with the scanning light from a front surface side and when the precursor is irradiated with the scanning light from a rear surface side; and FIG. 14 is a diagram useful in explaining the differences in reflectivity and transmissivity due to the presence and absence of the hard coat layer.

DESCRIPTION OF THE PREFERRED EMBODIMENTS

Preferred embodiments of a method of scanning an information recording medium and a scanning apparatus for an information recording medium according to the first present invention will now be described with reference to the attached drawings.

First, the construction of a multilayer optical recording medium 1 will be described with reference to the drawings.

Figure 1:
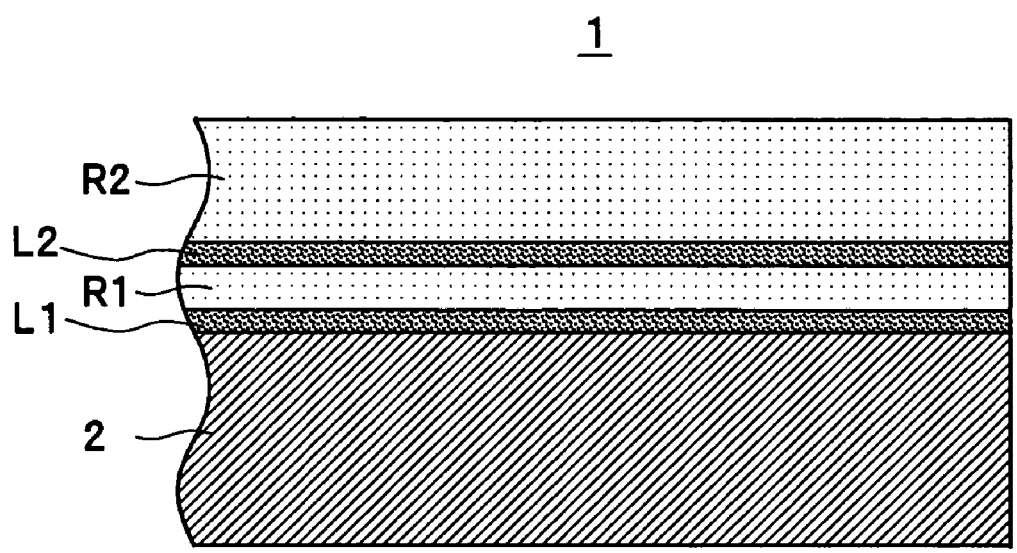
FIG. 1 is a cross-sectional view of a multilayer optical recording medium.

The multilayer optical recording medium 1 shown in FIG. 1 is one example of an information recording medium that is scanned by the method of scanning an information recording medium (hereinafter, simply "method of scanning") according to the present invention, and has the following laminated on one surface of a disc-like substrate 2 as principal functional layers: information layers L1, L2 (hereinafter, referred to simply as "information layers L" when no distinction is required); a resin layer R1 formed between the information layers L1, L2 by the photopolymerization method, for example; and a resin layer R2 formed on the surface of the information layer L2 as a cover layer (hereinafter, the resin layers are referred to simply as "resin layers R" when no distinction between the resin layers R1, R2 is required). In addition, the multilayer optical recording medium 1 is constructed so that recording data can be read and recorded by irradiation with a laser beam for recording and reproduction from the resin layer R2 side. As one example, the disc-like substrate 2 is formed in a disc-like form (a flat form) from polycarbonate with a diameter of around 120 mm and a thickness of around 1.1 mm. Also, as shown in FIG. 2, a mounting center hole 1a with a diameter of around 15 mm for mounting in a recording/reproduction apparatus is formed in a central part of the disc-like substrate 2.

As one example, the respective information layers L are constructed of layers, such as a reflective layer, a dielectric layer, and a phase-change recording layer, that are formed by sputtering. In this case, the thickness of the information layer L1 is set at 300 nm, for example, and the thickness of the information layer L2 is set at 200 nm, for example. As one example, the resin layers R are formed by applying an applied liquid including a UV curing resin by spin coating and hardening the applied liquid by irradiation with UV rays. In this case, the thickness of the resin layer R1 is set at 25 µm, for example, and the thickness of the resin layer R2 is set at 75 µm, for example.

Next, the construction of a multilayer optical recording medium scanning apparatus 11 (hereinafter, simply "scanning apparatus 11") that scans the multilayer optical recording medium 1 using the method of scanning according to the present invention will be described with reference to the drawings.

Figure 2:
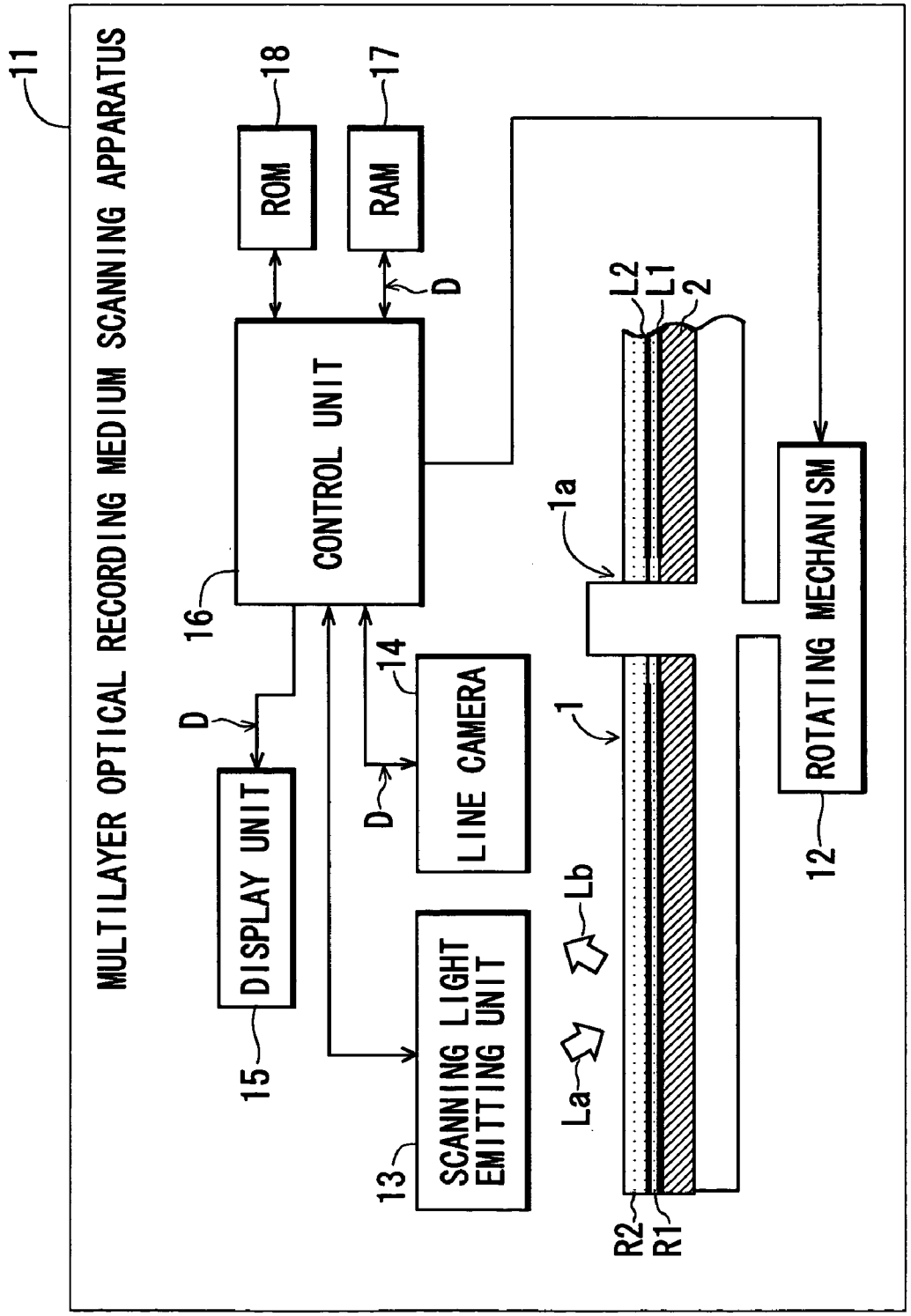
FIG. 2 is a block diagram showing the construction of a multilayer optical recording medium scanning apparatus according to an embodiment of the first present invention.

The scanning apparatus 11 shown in FIG. 2 is one example of a scanning apparatus for an information recording medium according to the present invention, and in addition to scanning for defects, such as foreign matter and bubbles, in the resin layers R1, R2 of the multilayer optical recording medium 1, specifies in which of the resin layers R1, R2 the defects are present. In more detail, the scanning apparatus 11 includes a rotating mechanism 12, a scanning light emitting unit 13, a line camera 14, a display unit 15, a control unit 16, a RAM 17, and a ROM 18. The rotating mechanism 12 includes a disc-like turntable, in a central part of which is formed a projection that can fit into the center hole 1a of the multilayer optical recording medium 1, and a motor (neither the turntable nor the motor is shown) that is driven and controlled by the control unit 16 and rotates the turntable.

Figure 3:
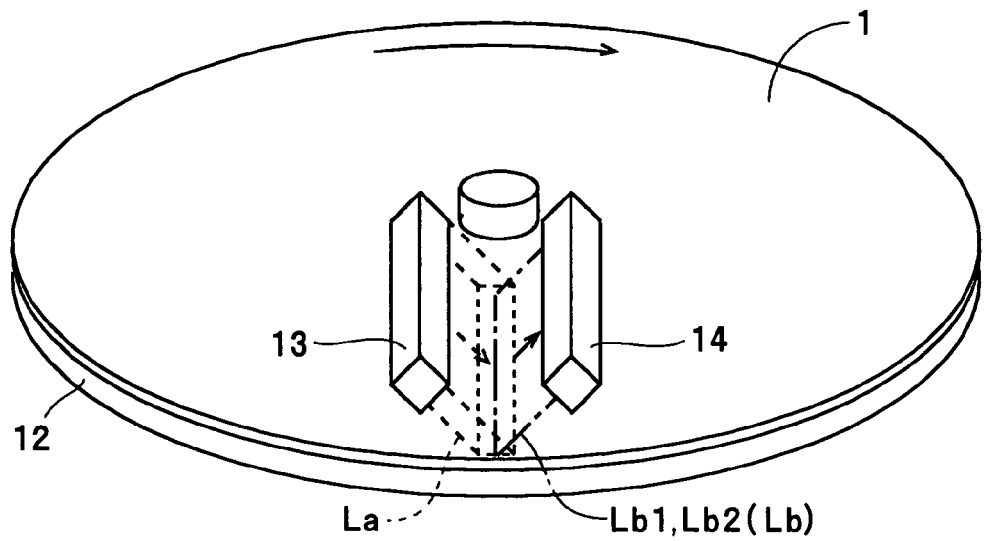
FIG. 3 is a perspective view of a multilayer optical recording medium mounted on a rotating mechanism, a scanning light emitting part, and a line camera that are shown in FIG. 2.

The scanning light emitting unit 13 includes a halogen lamp as a light source, a band pass filter that transmits light of a predetermined bandwidth, such as light with a peak wavelength of 650 nm, out of the light emitted from the halogen lamp, a sharp cut filter that cuts light of a wavelength, such as 610 nm and below, out of the light transmitted by the band pass filter, a linear polarization plate that converts the light that has passed the sharp cut filter into circularly-polarized light, and a λ/4 retardation film. The scanning light emitting unit 13 emits the scanning light La (light converted to circularly-polarized light) for scanning purposes. Also, as shown in FIG. 3, the scanning light emitting unit 13 is fixed above the rotating mechanism 12 so as to be able to emit the scanning light La at an irradiation angle, such as 45°, at a belt-like irradiated part (the part shown by the dotted line in FIG. 3) disposed along the radial direction of the multilayer optical recording medium 1 mounted on the turntable of the rotating mechanism 12. The line camera 14 is one example of an "image capture unit" for the present invention, and includes a plurality (for example, 4,096) of photoelectric elements disposed in a line and carries out an image capture process that receives reflected light Lb1, Lb2 (hereinafter referred to as the "reflected light Lb" when no distinction is required) for the scanning light La and outputs image capture data D. In this case, under the control of the control unit 16, the line camera 14 carries out the image capture process 24,000 times, for example, at predetermined time intervals during a single revolution of the multilayer optical recording medium 1 by the rotating mechanism 12. In addition, as shown in FIG. 3, the line camera 14 is fixed onto an optical path of the reflected light Lb above the rotating mechanism 12 so that the lengthwise direction of the line camera 14 matches the radial direction of the multilayer optical recording medium 1 mounted on the turntable of the rotating mechanism 12. Under the control of the control unit 16, the display unit 15 displays an image based on the image capture data D, an image showing the scanning result, and the like.

The control unit 16 corresponds to a "counting unit" and a "specifying unit" for the present invention, and controls the rotating mechanism 12, the scanning light emitting unit 13, the line camera 14, and the display unit 15. Also, by carrying out image processing using the image capture data D outputted from the line camera 14, when images M (see FIGS. 5 and 7) for defects F1, F2 (see FIGS. 4 and 6; hereinafter F1 and F2 are referred to simply as "defects F" when no distinction is required) have been captured, the control unit 16 carries out a counting process (a counting step) by finding images M for the same defect F (that is, images M with the same form, hereinafter referred to as the "same images M") and counting the number of the same images M. Based on the counted number of the same images M, the control unit 16 carries out a specifying process (a specifying step) that specifies on which of the resin layers R1, R2 the defect F is present. More specifically, when the number of counted images is three (one example of a "number N" for the present invention), the control unit 16 specifies that the resin layer R in which the defect F corresponding to the images M is present is the second resin layer R2 (one example of the "(N−1)-th layer" for the present invention) counting from the disc-like substrate 2 side. Similarly, when the number of images is two (another example of the number N for the present invention), the control unit 16 specifies that the resin layer R in which the defect F corresponding to the images M is present is the first resin layer R1 (another example of the "(N−1)-th layer" for the present invention) counting from the disc-like substrate 2 side. The RAM 17 stores the image capture data D outputted from the line camera 14. The ROM 18 stores various processing programs for the image processing, the counting process, the specifying process, and the like executed by the control unit 16.

Next, the method of scanning for the multilayer optical recording medium 1 using the scanning apparatus 11 will be described with reference to the drawings.

Figure 4:
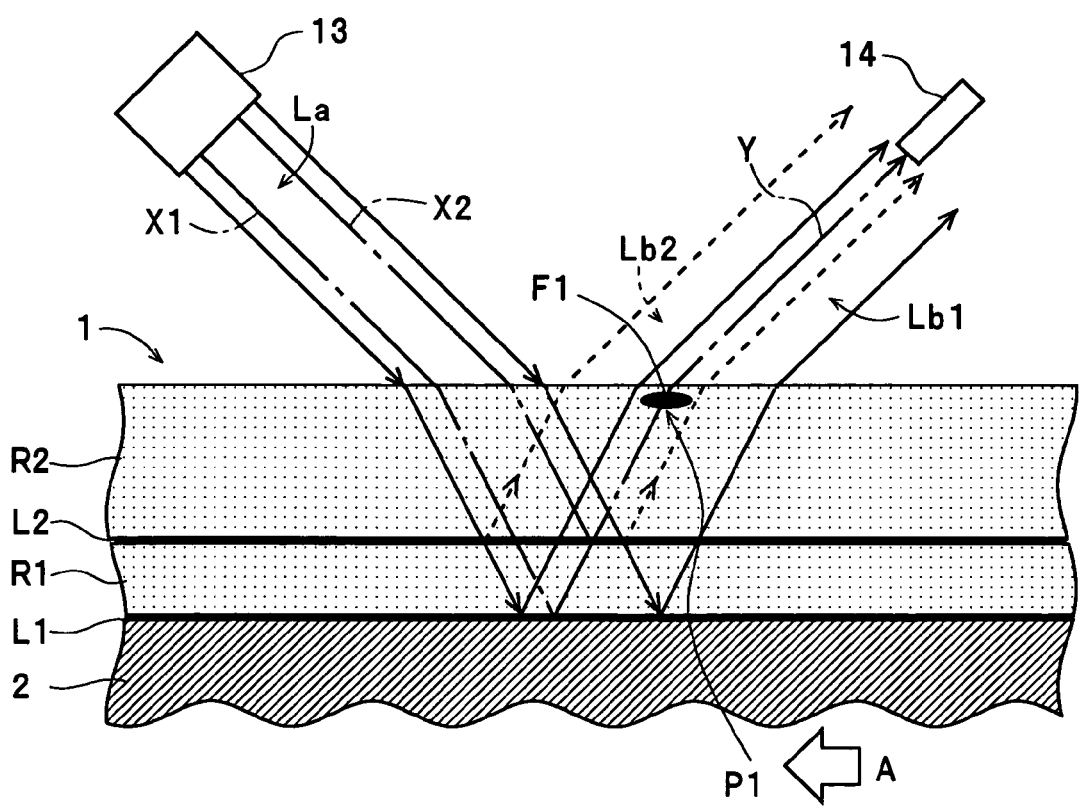
FIG. 4 is a cross-sectional view of a multilayer optical recording medium in a state where the medium is irradiated with scanning light.

First, as shown in FIG. 2, in a state where the surface on which the information layers L1, L2 and the resin layers R1, R2 are formed faces upwards, the multilayer optical recording medium 1 is mounted with the center hole 1a fitted onto the projection of the turntable of the rotating mechanism 12. Next, the control unit 16 has the scanning light emitting unit 13 emit the scanning light La. At this time, as shown in FIG. 3, the scanning light La emitted from the scanning light emitting unit 13 is emitted at an irradiation angle, for example an inclination of 45° to the surface of the multilayer optical recording medium 1, at a belt-like irradiated part along a radial direction of the surface of the multilayer optical recording medium 1. Also, as shown in FIG. 4, the emitted scanning light La is refracted at a boundary surface between the air and the resin layer R2, is emitted inside the resin layer R2 at an incident angle that is inclined to a normal of the boundary surface by 26.85°, for example, and some of the scanning light La is reflected by a reflecting layer that composes the information layer L2. In this case, the reflected light Lb2 reflected by the information layer L2 is refracted again at the boundary surface between the resin layer R2 and the air and is emitted at an inclination of 45° to the surface of the multilayer optical recording medium 1 (the resin layer R2). On the other hand, as shown in FIG. 4, another part of the scanning light La aside from the part that was reflected by the information layer L2 passes through the information layer L2 and becomes incident on the resin layer R1 where the light is reflected by the reflecting layer that composes the information layer L1. Here, the reflected light Lb1 reflected by the information layer L1 passes through the information layer L2 and the resin layer R2, is refracted at the boundary surface between the resin layer R2 and the air and is emitted at an inclination of 45° to the surface of the resin layer R2. Accordingly, as shown in FIG. 4, another part of the scanning light La emitted from the scanning light emitting unit 13 is incident on the line camera 14 along the incident-side optical path X2 and the reflection-side optical path Y (both optical paths are shown by dot-dash lines in FIG. 4), with yet another part of the scanning light La being incident on the line camera 14 along the incident-side optical path X1 (also shown by a dot-dash line in FIG. 4) and the reflection-side optical path Y. In this case, the two incident-side optical paths X1, X2 are set so as to be displaced in the front-rear direction with respect to the rotational direction (the direction shown by the arrow A in FIG. 4) of the turntable. In the present embodiment, as one example, the incident-side optical path X2 is set so as to be positioned in front of the incident-side optical path X1. It should be noted that at this point, the defect F1 shown in FIG. 4 is assumed to be located to the right of the position shown in FIG. 4.

Next, the control unit 16 drives and controls the motor of the rotating mechanism 12 so as to rotate the turntable at a predetermined rotational velocity in the direction of the arrow A shown in FIG. 4. The control unit 16 also outputs a control signal that has the line camera 14 carry out image capture. In response, the line camera 14 commences the image capture process and outputs the image capture data D, with the RAM 17 storing the image capture data D transferred by the control unit 16. In this case, the line camera 14 carries out image capture 24,000 times, for example, during one revolution of the multilayer optical recording medium 1 by the rotating mechanism 12. In one image capturing process, the line camera 14 carries out image capturing for a belt-like part with a width of approximately 15 μm along the radial direction of the multilayer optical recording medium 1. On the other hand, the motor of the rotating mechanism 12 starts to rotate and as shown in FIG. 4, when, for example, the defect F1 present in the resin layer R2 of the multilayer optical recording medium 1 has moved to a position P1 that intersects the reflection-side optical path Y due to rotation of the multilayer optical recording medium 1, the reflected light Lb produced by a shadow due to the defect F1 becomes incident on the line camera 14 along the reflection-side optical path Y. At this time, the line camera 14 receives the reflected light Lb produced by the shadow and outputs image capture data D in accordance with the shadow. That is, the line camera 14 captures an image of the image M of the defect F1.

Figure 5:
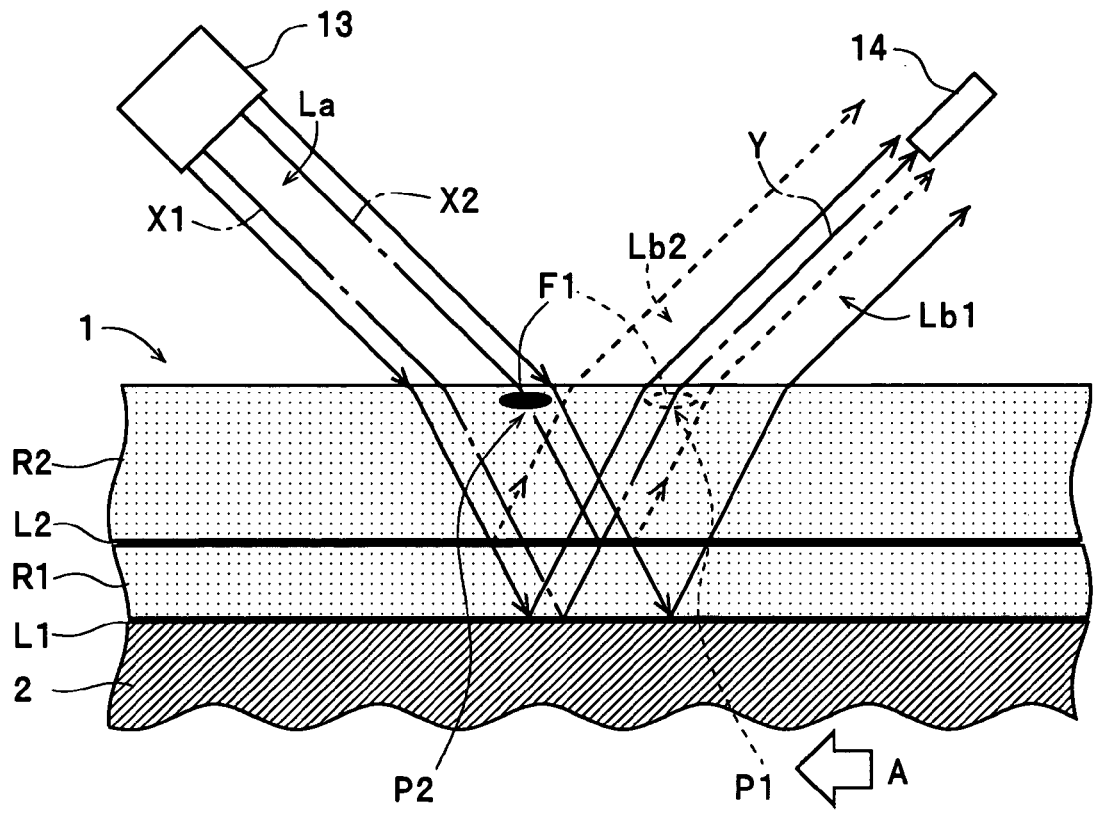
FIG. 5 is a cross-sectional view of the multilayer optical recording medium when the medium is irradiated with scanning light in a state where one defect has moved onto an incident-side optical path on a front side.
Figure 6:
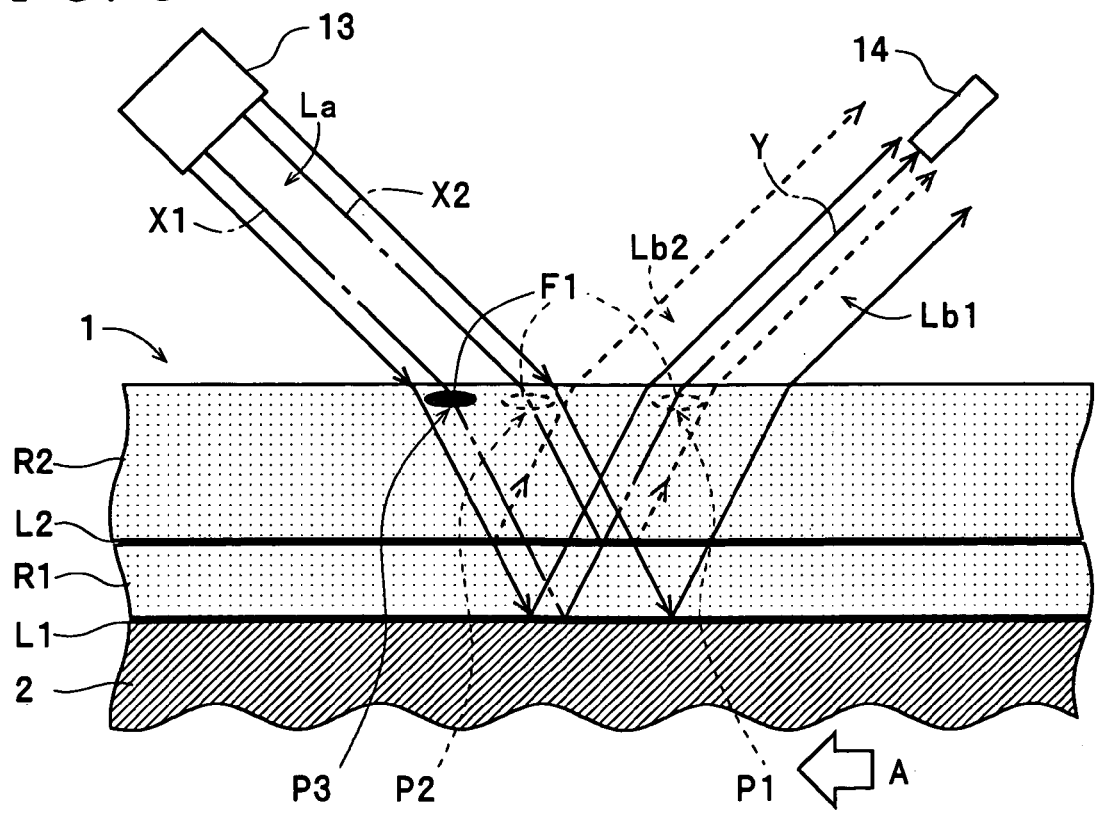
FIG. 6 is a cross-sectional view of the multilayer optical recording medium when the medium is irradiated with scanning light in a state where the defect has moved onto an incident-side optical path on a rear side.
Figure 7:
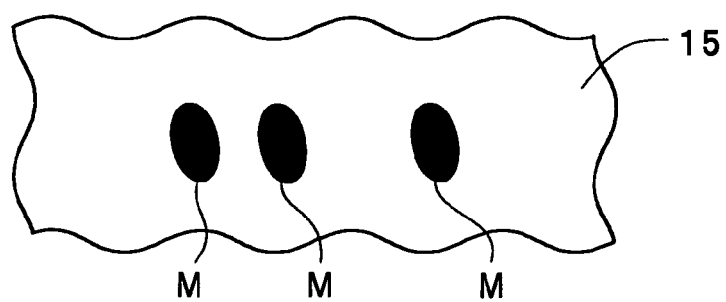
FIG. 7 is a diagram showing a display screen of a display unit that displays images of a defect.

Next, the multilayer optical recording medium 1 is further rotated and as shown in FIG. 5, when the defect F1 has moved to a position P2 that intersects the incident-side optical path X2 to the front side, the scanning light La in which a shadow has been produced by the defect F1 becomes incident on the resin layer R2 along the incident-side optical path X2, is reflected by the information layer L2, and the resulting reflected light Lb becomes incident on the line camera 14 along the reflection-side optical path Y. At this point, the line camera 14 receives the reflected light Lb due to the shadow and outputs the image capture data D in accordance with the shadow. Next, the multilayer optical recording medium 1 is rotated further and as shown in FIG. 6, when the defect F1 has moved to a position P3 that intersects the incident-side optical path X1 to the rear side, the scanning light La in which a shadow has been produced by the defect F1 becomes incident on the resin layer R2 along the incident-side optical path X1, and passes through the information layer L2 to become incident on the resin layer R1. In addition, the scanning light La incident on the resin layer R1 is reflected by the information layer L1 and the resulting reflected light Lb becomes incident on the line camera 14 along the reflection-side optical path Y. At this point, the line camera 14 receives the reflected light Lb due to the shadow and outputs the image capture data D in accordance with the shadow. In this case, the defect F1 present in the resin layer R2 is moved by the rotation of the multilayer optical recording medium 1 and intersects a total of three optical paths, the reflection-side optical path Y, the incident-side optical path X1, and the incident-side optical path X2, so that images M of the defect F1 are captured by the line camera 14 three times. Accordingly, as shown in FIG. 7, three images M, M, M of the defect F1 are displayed on the display screen based on the image capture data D outputted from the line camera 14.

Figure 8:
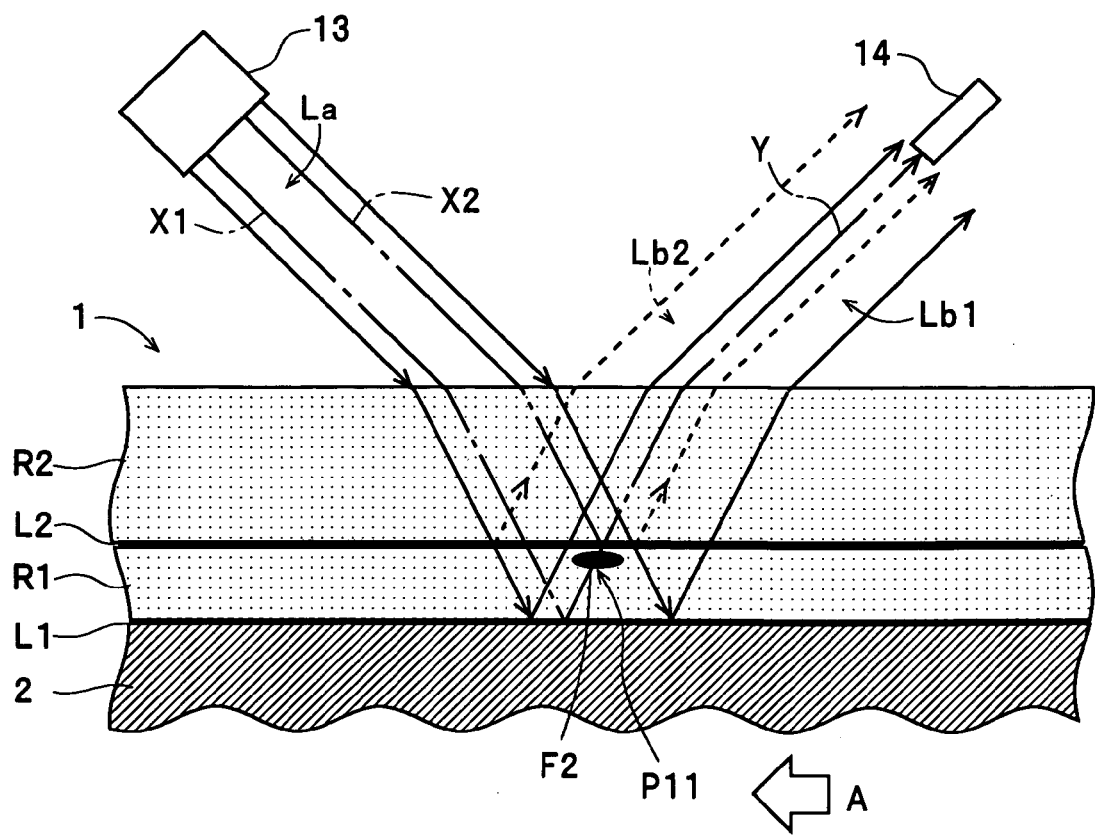
FIG. 8 is a cross-sectional view of the multilayer optical recording medium when the medium is irradiated with scanning light in a state where a defect has moved onto a reflection-side optical path.
Figure 9:
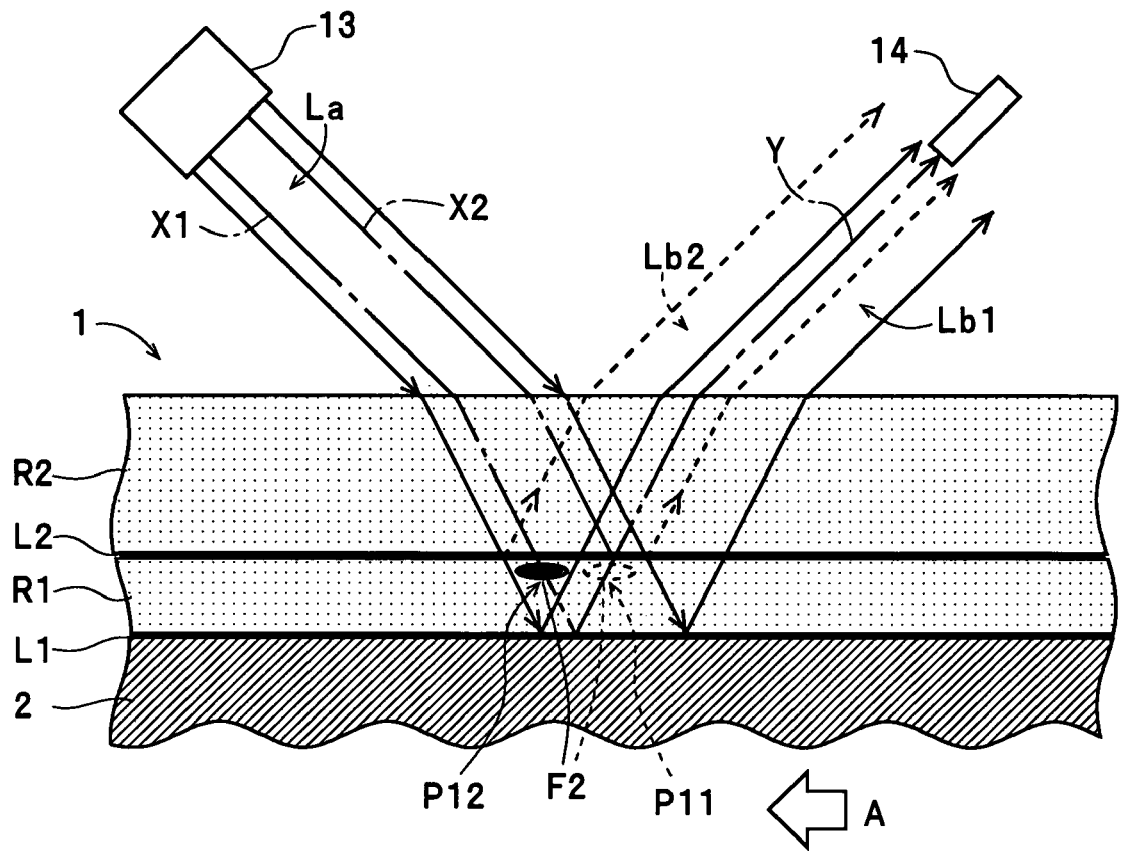
FIG. 9 is a cross-sectional view of the multilayer optical recording medium when the medium is irradiated with scanning light in a state where the defect has moved onto the incident-side optical path to the rear side.
Figure 10:
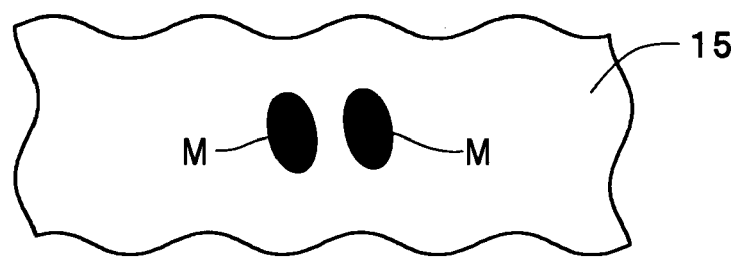
FIG. 10 is a diagram showing a display screen of the display unit that displays images of a defect.

On the other hand, as shown in FIG. 8, when the defect F2 present in the resin layer R1 of the multilayer optical recording medium 1 has moved to a position P11 that intersects the reflection-side optical path Y due to the rotation by the rotating mechanism 12, the reflected light Lb in which a shadow has been produced by the defect F2 becomes incident on the line camera 14 along the reflection-side optical path Y, and the line camera 14 outputs image capture data D in accordance with the shadow. Next, the multilayer optical recording medium 1 is rotated further and as shown in FIG. 9, when the defect F2 has moved to a position P12 that intersects the incident-side optical path X1, the scanning light La in which a shadow has been produced by the defect F2 becomes incident along the incident-side optical path X1, is reflected by the information layer L1, and the resulting reflected light Lb becomes incident on the line camera 14 along the reflection-side optical path Y. At this point, the line camera 14 receives the reflected light Lb and outputs image capture data D in accordance with the shadow. In this case, the defect F2 present in the resin layer R1 is moved by the rotation of the multilayer optical recording medium 1 and therefore intersects a total of two optical paths, the reflection-side optical path Y and the incident-side optical path X1, so that images M of the defect F2 are captured by the line camera 14 twice. Accordingly, as shown in FIG. 10, two images M, M of the defect F2 are displayed on the display screen based on the image capture data D outputted from the line camera 14.

Next, when the rotating mechanism 12 has rotated the multilayer optical recording medium 1 once, the control unit 16 has the rotating mechanism 12 stop rotating the multilayer optical recording medium 1 and has the line camera 14 stop carrying out the image capture. By doing so, image capture is carried out for the entire surface of the multilayer optical recording medium 1 in 24,000 captures that have a width of approximately 15 μm along the radial direction, and the resulting image capture data D is stored in the RAM 17. Next, the control unit 16 has the display unit 15 display a display screen based on the image capture data D, and executes the counting process (the counting step) based on the image capture data D. In this counting process, the control unit 16 first carries out image processing based on the image capture data D. More specifically, in this process, the control unit 16 detects images M whose forms are the same or are similar (i.e., the "same images M") across the entire surface of the multilayer optical recording medium 1. Next, in the counting process, the control unit 16 counts the number of detected images. After this, the control unit 16 carries out a specifying process (the specifying step) that specifies the resin layer R in which the defect F is present based on the counted number of images. When doing so, if the counted number of the same images M is three, the control unit 16 specifies that the resin layer R in which the defect F corresponding to the images M is present is the resin layer R2 that is the second layer counting from the disc-like substrate 2 side. On the other hand, if the number of same images M is two, the control unit 16 specifies that the resin layer R in which the defect F corresponding to the images M is present is the resin layer R1 that is the first layer counting from the disc-like substrate 2 side. After this, the control unit 16 repeatedly carries out the counting process and the specifying process and when the counting process and the specifying process have been completed for all of the images M based on the image capture data D, the control unit 16 has the display unit 15 display an image showing the number of defects F present in the respective resin layers R1, R2.

In this way, according to this method of scanning and the scanning apparatus 11, the number of images M for the same defect F subjected to image capture by the image capturing process of the line camera 14 is counted, and by specifying the resin layer R2, which is the second layer counting from the disc-like substrate 2 side, as the resin layer R in which the defect F is present when the number is three and specifying the resin layer R1, which is the first layer counting from the disc-like substrate 2 side, as the resin layer R in which the defect F is present when the number is two, the resin layer in which the defect F is present can be easily and reliably specified by counting the number of images. Accordingly, since it is possible to correct the formation conditions of the resin layer R in which the defect F is present to appropriate formation conditions, it is possible to reliably reduce the occurrence of defects F in the resin layer R in question, and as a result, the product yield can be considerably improved. Since it is possible to immediately specify the resin layer R in which a defect has occurred from the counted number of images without carrying out a complex calculation, even if many defects F are present, it is possible to specify the resin layer R in which the respective defects F are present in a sufficiently short time.

Also, according to this method of scanning and the scanning apparatus 11, when counting the images M, image processing is carried out using the image capture data D and images of the same form are found. By counting the found images as images M for the same defect F, the ability to correctly find the images of the same form makes it also possible to correctly count only images for the same defect F. As a result, it is possible to correctly specify the resin layer in which the defect is present.

It should be noted that the present invention is not limited to the method and construction described above. For example, although an example where a multilayer optical recording medium 1 that has two information layers L1, L2 and two resin layers R1, R2 laminated on one surface of the disc-like substrate 2 has been described, a resin layer in which a defect is present can be reliably specified for a multilayer optical recording medium that has three or more of both resin layers and information layers laminated on one surface of the disc-like substrate 2 and a multilayer optical recording medium that has a plurality of resin layers and information layers laminated on both surfaces. Also, an "information recording medium" that is scanned by the method of scanning an information recording medium and a scanning apparatus for an information recording medium according to the present invention is not limited to an optical recording medium such as a DVD, and includes various kinds of information recording media, such as magneto-optical recording media, with a plurality of recording layers. In addition, although an example of a construction where the control unit 16 executes the counting process and the specifying process has been described, it is also possible for the user to find images M of the same form from the images M displayed on the display unit 15, to count the number of images M, and to specify the resin layer R in which a defect is present based on the counted number of images. In this case, using printouts where images M (patterns corresponding to the images M) are printed out based on the image capture data D, images M of the same form may be found and the number of images may be counted.

Preferred embodiments of a method of scanning and a scanning apparatus according to the second present invention will now be described with reference to the attached drawings.

First, the construction of a scanning apparatus 101 will be described with reference to the drawings.

Figure 11:
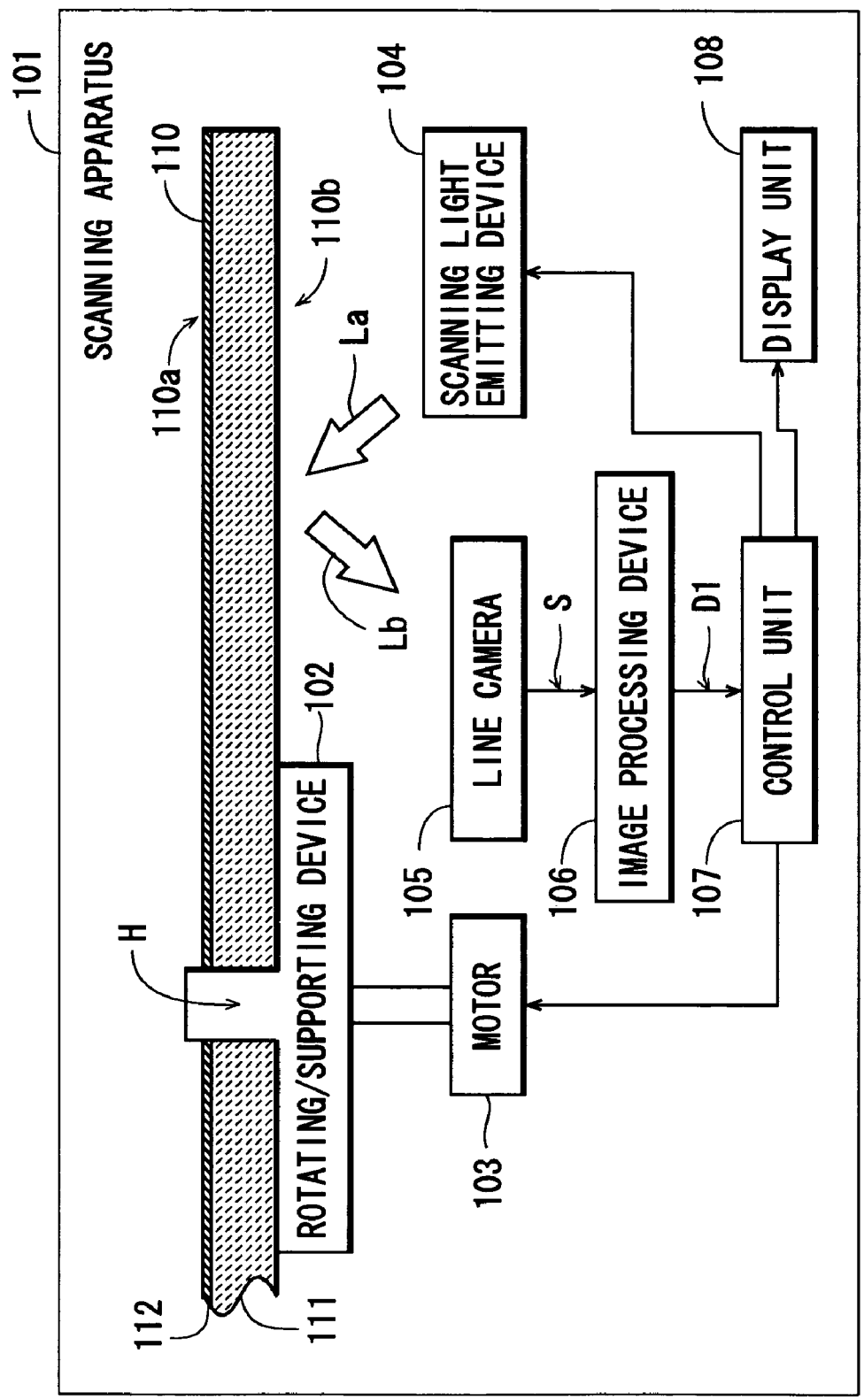
FIG. 11 is a block diagram showing the construction of a scanning apparatus according to an embodiment of the second present invention.

The scanning apparatus 101 shown in FIG. 11 is an apparatus that scans an optical disc manufacturing precursor (hereinafter also referred to as the "precursor") according to a method of scanning of the present invention, and includes a rotating/supporting device 102, a motor 103, a scanning light emitting device 104, a line camera 105, an image processing device 106, a control unit 107, and a display unit 108. In this case, the precursor 110 to be scanned is one example of an "information recording medium precursor" for the present invention, and has a hard coat layer 112 (one example of a "resin layer" for the present invention) formed by spin coating one surface (the upper surface in FIG. 11) of a substrate 111, which has been produced by injection molding polycarbonate that transmits light, with an acrylic resin (a UV curing resin). In this case, as one example, an optical disc (an information recording medium) is manufactured from this precursor 110 by forming layers such as a recording layer, a reflecting layer and a protective layer (not shown) on the other surface (the lower surface in FIG. 11 or "rear surface $110b$") of the substrate 111. For an optical disc manufactured using this precursor 110, data is recorded and reproduced by irradiating the disc from the hard coat layer 112 side (a front surface $110a$ side of the precursor 110) with a laser beam.

Together with the motor 103, the rotating/supporting device 102 constructs a "substrate rotating mechanism" for the present invention, and engages a rim part of an attachment center hole H formed in the precursor 110 and supports the precursor 110 so that the precursor 110 is rotated by rotation of the motor 103. The motor 103 rotates the rotating/supporting device 102 at a fixed velocity under the control of the control unit 107. The scanning light emitting device 104 corresponds to a "light emitting unit" for the present invention and, under the control of the control unit 107, has the precursor 110 irradiated with scanning light La (the light used for scanning) from the rear surface $110b$ side. The line camera 105 corresponds to a "light receiving unit" for the present invention and receives reflected light Lb that has been emitted by the scanning light emitting device 104 and reflected by the precursor 110 (i.e., the line camera 105 captures an image of the rear surface $110b$ of the precursor 110) and outputs a signal S corresponding to the state of the received light. In this case, the line camera 105 has 4,096 light receiving elements disposed in a straight line and is constructed so as to be able to capture an image of a linear region in a radial direction of the precursor 110 from an inner periphery of the precursor 110 to an outer edge.

The image processing device 106 generates image data D1 by carrying out image processing on the signal S under the control of the control unit 107. Together with the image processing device 106, the control unit 107 constructs a "scanning unit" for the present invention, and scans for defects in the hard coat layer 112 of the precursor 110 based on the generated image data D1 (that is, the state of the received light Lb received by the line camera 105). Based on the image data D1, when the size of detected defects or number of detected defects exceeds a predetermined standard, the control unit 107 judges that the precursor 110 is defective and displays the result of this judgment on the display unit 108. The display unit 108 displays the result of the judgment by the control unit 107 (as examples, information showing whether a precursor is a non-defective product, an image showing the detection positions of defects and the sizes of defects, and the like).

Next, the method of scanning the precursor 110 using the scanning apparatus 101 will be described with reference to the drawings.

First, the precursor 110 is set on the rotating/supporting device 102 with the surface on which the hard coat layer 112 is formed (that is, the front surface $110a$) facing upwards. Next, the control unit 107 controls the motor 103 to have the rotating/supporting device 102 rotated at a constant velocity, for example, 25 rpm. After this, the control unit 107 controls the scanning light emitting device 104 to have the precursor 110 irradiated with the scanning light La from the rear surface 110b side of the precursor 110 and controls the line camera 105 to have image capturing commence for the rear surface 110b. At this time, the line camera 105 outputs the signal S, which corresponds to the state of the reflected light Lb (in this case, the amount of light received by the respective light receiving elements) that has been emitted by the scanning light emitting device 104 and reflected by the precursor 110, to the image processing device 106. The image processing device 106 generates the image data D1 by carrying out image processing on the outputted signal S and outputs the image data D1 to the control unit 107. On the other hand, based on the image data D1 outputted from the image processing device 106, the control unit 107 scans for defects in the hard coat layer 112 of the precursor 110.

More specifically, when a defect such as an unapplied region or an irregularity is present in the hard coat layer 112, the scanning light La will be diffused at the position of the defect, thereby lowering the reflectivity, which causes the amount of reflected light Lb received by the line camera 105 to fall at the position of the defect. Accordingly, based on the image data D1 outputted from the image processing device 106, when there is a position at which the amount of light received by the line camera 105 falls below a predetermined standard value, the control unit 107 detects the presence of a defect at that position. Also, when the size of a detected defect or the number of defects exceeds a standard for judging whether a product is defective, the control unit 107 judges that the precursor 110 is defective and, for example, has a "The scanned disc is defective" message and an image showing the sizes and detection positions of defects displayed on the display unit 108. In this way, the scanning of the precursor 110 is completed.

The inventor confirmed that there is a large difference in the reflectivity for the scanning light La between when the precursor 110 is irradiated with the scanning light La from the front surface 110a side and when the precursor 110 is irradiated with the scanning light La from the rear surface 110b side. More specifically, as shown in FIG. 12, when a substrate 111 that is 0.6 mm thick and on which the hard coat layer 112 has not been formed (that is, a substrate 111 which is "defective" in that the hard coat layer 112 is yet to be applied) is irradiated with the scanning light La from the front surface 110a side, the reflectivity for the scanning light La is 8.90%, but when the substrate 111 is irradiated from the rear surface 110b side, the reflectivity for the scanning light La is 9.10%. On the other hand, as shown in FIG. 13, when a substrate 111 on which the hard coat layer 112 has been formed (that is, a substrate 111 in a state with no defects) is irradiated with the scanning light La from the front surface 110a side, the reflectivity for the scanning light La is 8.70%, but when the substrate 111 is irradiated from the rear surface 110b side, the reflectivity for the scanning light La is 8.75%. Accordingly, as shown in FIG. 14, although there is only a small difference of 0.20% in the reflectivity for the scanning light La caused by the presence of the hard coat layer 112 on the substrate 111 when the substrate 111 is irradiated from the front surface 110a side, there is a large difference of 0.35% when the substrate 111 is irradiated from the rear surface 110b side. For this reason, when the substrate 111 is irradiated with the scanning light La from the rear surface 110b side, the presence of the hard coat layer 112 on the substrate 111 (the presence or absence of defects) can be judged more clearly than when the substrate 111 is irradiated from the front surface 110a side. It should be noted that as shown in FIGS. 2 to 4, it was confirmed that there was no difference in light transmissivity when the substrate 111 is irradiated with the scanning light La from the front surface 110a and the rear surface 110b.

In this way, by irradiating the substrate 111 with the scanning light La from the rear surface 110b side and scanning for defects according to the method of scanning the precursor 110 using the scanning apparatus 101, there is a greater difference in the reflectivity due to the presence or absence of the hard coat layer 112 than when the substrate 111 is irradiated with the scanning light La from the front surface 110a side, so that even minute defects that could not be detected with a conventional scanning apparatus can be reliably detected. As a result, it is possible to correctly detect whether the precursor 110 is defective or non-defective.

It should be noted that the present invention is not limited to the method and construction described above. For example, although an example where a precursor 110 with a substrate 111 formed of polycarbonate has been described, the present invention is not limited to this, and the scanning apparatus 101 can favorably scan for defects in an information recording medium with a substrate formed of polyolefin. Also, although an example where the scanning for defects is carried out for a hard coat layer 112 has been described, the present invention is not limited to a hard coat layer 112 and can be applied to scanning all kinds of resin layers. In addition, the information recording medium precursor for the present invention is not limited to a precursor for an optical recording medium such as a CD or a DVD, and also includes a precursor for a magneto-optical recording medium such as an MO.

What is claimed is:

1. A method of scanning an information recording medium that has a plurality of resin layers and a plurality of information layers, which are separated by the respective resin layers, laminated on at least one surface of a substrate, the method scanning the respective resin layers for defects and comprising:
an image capture step of emitting scanning light toward the one surface at a predetermined incident angle from a fixed position on the one surface side, rotating the information recording medium in a fixed direction, and simultaneously receiving reflected light for the scanning light at a fixed position on an optical path of the reflected light to capture images at predetermined time intervals;
a counting step of counting a number of images of a same defect that have been captured in the image capture step; and
a specifying step of specifying that an (N−1)-th resin layer counting from the substrate side is a resin layer in which the defect is present when the counted number of images is N, where N is a natural number of two or higher.

2. A method of scanning an information recording medium according to claim 1,
wherein in the counting step, image processing is carried out using image capture data produced during the image capture step to find images with the same form and the found images are counted as images of the same defect.

3. A scanning apparatus for an information recording medium, comprising:
a scanning light emitting unit that is fixed on one surface side of an information recording medium having a plurality of resin layers and a plurality of information layers, which are separated by the respective resin layers, laminated on at least one surface of a substrate and emits scanning light at a predetermined incident angle toward the one surface;

a rotating mechanism that rotates the information recording medium in a fixed direction;

an image capture unit that is fixed on an optical path of reflected light for the scanning light and receives the reflected light to capture images at predetermined time intervals;

a counting unit that counts a number of images of a same defect that have been captured by the image capture unit; and a specifying unit that specifies that an (N−1)-th resin layer counting from the substrate side is a resin layer in which the defect is present when the counted number of images is N (where N is a natural number of two or higher).

4. A scanning apparatus for an information recording medium according to claim 3, wherein the counting unit carries out image processing using image capture data produced by the image capture unit to find images with the same form and counts the found images as images of the same defect.

* * * * *